No. 632,292. Patented Sept. 5, 1899.
H. G. VOIGHT.
MASTER KEY PADLOCK.
(Application filed Mar. 14, 1899.)
(No Model.)
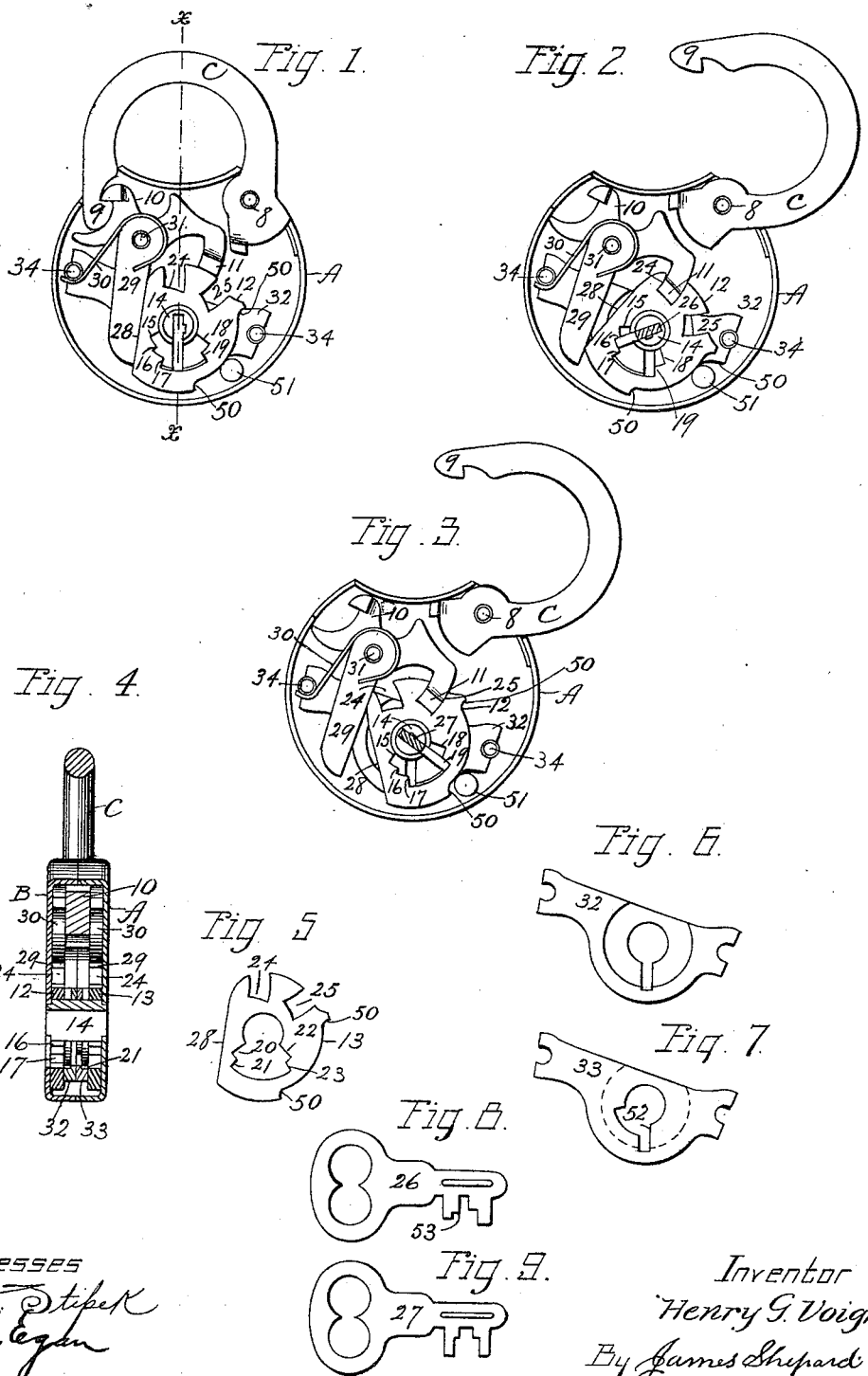
Witnesses
AW Stipek
P. J. Egan
Inventor
Henry G. Voight.
By James Shepard
Attys.

UNITED STATES PATENT OFFICE.

HENRY G. VOIGHT, OF NEW BRITAIN, CONNECTICUT, ASSIGNOR TO THE RUSSELL & ERWIN MANUFACTURING COMPANY, OF SAME PLACE.

MASTER-KEY PADLOCK.

SPECIFICATION forming part of Letters Patent No. 632,292, dated September 5, 1899.

Application filed March 14, 1899. Serial No. 709,074. (No model.)

*To all whom it may concern:*

Be it known that I, HENRY G. VOIGHT, a citizen of the United States, residing in New Britain, in the county of Hartford and State of Connecticut, have invented certain new and useful Improvements in Master-Key Padlocks, of which the following is a specification.

My invention relates to improvements in padlocks; and the main object of my improvement is to produce a master-key padlock of a simple and efficient construction and one that may have a great many changes in the master-key.

In the accompanying drawings, Figure 1 is a front elevation of my padlock with the front plate or cap removed and with the shackle locked. Fig. 2 is a like view of the same as unlocked by the change-key, which is shown in transverse section. Fig. 3 is a like view of the same as unlocked by the master-key, which is shown in transverse section. Fig. 4 is a sectional view of the padlock on the line *x x* of Fig. 1, looking toward the left. Fig. 5 is a detached plan view of the rear tumbler. Figs. 6 and 7 are detached plan views of the two ward-plates; and Figs. 8 and 9 are side elevations, respectively, of the change-key and the master-key.

The general construction of the padlock is the same as in my Patent No. 618,487, dated January 31, 1899.

A designates the main part or one half of the case, and B designates the cap or companion half of the case. The shackle C is pivoted to the case, as at 8, and is locked at its nose 9 by the lever-dog 10, the wing 11 of which dog is locked by the tumblers 12 13. The said tumblers are mounted concentrically upon the ordinary slotted key-hub 14, substantially as in my aforesaid patent, with central openings extended toward one side for the admission of a key and provided with edge faces adapted to be engaged by the flat side of a key-bit. The front tumbler 12 has three faces 15, 16, and 17 on the left-hand edge of its central or key opening and two faces 18 and 19 on the right-hand edge of its key-opening. The rear tumbler 13 has two edge faces 20 and 21 on the left-hand edge of its key-opening and two other faces 22 and 23 on the opposite edge of said key-opening. Each tumbler has a notch or recess 24 to receive the wing of the dog 10 when moved by the change-key 26 and a second notch or recess 25 to receive said wing when acted upon by the master-key 27. Each tumbler also has at its outer edge a stop-face 28, that is acted upon by one of the two stops 29 through the influence of the springs 30, the said stop and spring together forming a spring-stop. The said stops 29 are pivoted to the post 31, which in the present case also serves as the pivot for the dog 10. In addition to the spring-stops each tumbler is provided with two stop-shoulders 50 for engaging the post 51 when the tumblers are turned by any means other than a properly-bitted key, which shoulders are so related to said post and the notch or recesses 24 and 25 that when the tumblers are moved in one direction said stop-shoulder does not act until the notch 24 is carried a little beyond the registering position for the wing 11 of the dog 10, and when turned in the opposite direction not until the notch 25 is carried beyond said position, thereby making the lock more difficult to pick. Between the two tumblers are the two ward-plates 32 and 33, the plate 32 being the front one, while 33 is at the rear. Said plates have notches in their end, so that the posts 34 in the lock-case may assist in holding said ward-plates in place.

The tumblers are free to rotate in either direction, and the stop-faces 28 and stops 29, under the action of the springs 30, will normally stop and hold the tumblers in the position shown in Fig. 1, when the shackle is locked, no matter which way the tumblers may be turned. When the change-key 26, Fig. 8, is used, it is turned in the right-hand direction—that is, so as to carry its bit to the left. Of course only one of the edge faces of the tumblers on any one side of the key-opening can be properly acted upon by a key, and, as shown, the change-key acts on the face 16 of the front tumbler and 21 of the rear tumbler, thereby bringing the slot 24 in all the tumblers under the wing of the dog 10 to unlock the shackle, as shown in Fig. 2, the change-key being shown in transverse section at 26 and in proper engagement with the tumblers. The master-key 27, Fig. 9, is turned in the opposite direction, as shown in Fig. 3, and acts upon the edge face 19 of the front tumbler and face 23 of the rear tumbler, so as to present the second notch 25 to the wing 11 of the dog. There can be as many changes made in the master-key as there can be in the change-key, and by having the edge faces on opposite sides of the same key-opening, one side for the master-key and the other side for the change-key, there is no danger of confusing the changes so that any of the change-keys shall act as a master-key. In order to prevent the change-keys from being turned in the wrong direction, and thus acting on the edge faces belonging to the master-key, I provide one of the ward-plates 33 with a stop-shoulder 52 and form one step 53 in the change-key bit, Fig. 8, so as to engage the said shoulder of said ward-plate and prevent the change-key from being turned in that direction. The ward-plates and change-keys may be variously fitted in any ordinary manner, and where the ward-plates vary for the change-keys the master-key may be slotted at its middle portion, as shown, so as to pass all of the different ward-plates in a series of locks. The construction is simple, and the tumblers respond very quickly to the keys, so as to make a sensitive lock.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. In a master-key lock, the tumblers mounted concentrically with the axis of the key and having edge faces on opposite edges of their key-openings for being acted upon by the flat sides of keys that are turned in opposite directions, substantially as described.

2. In a lock, the combination of the tumblers mounted concentrically to the axis of the key and having edge faces for the key on opposite sides of its key-opening, said tumblers having also the two recesses in their periphery, and the locking-dog having a wing 11 for engaging said periphery and adapted to be released by entering either of the said two recesses in the said tumblers, substantially as described.

3. In a lock, the tumblers adapted to turn in either direction and having a stop-face, in combination with a spring-stop acting on said stop-faces to hold the tumblers when released in their intermediate position ready to be turned in either direction, substantially as described.

4. In a lock, the tumblers adapted to turn in either direction and having two notches 24 and 25, stop-shoulders 50 and a stop-face 28 on their edges, in combination with a fixed obstruction for said stop-shoulders to act upon and a spring-stop acting on said stop-faces 28 to properly set the tumblers when released, substantially as described.

5. In a master-key lock, the tumblers mounted concentrically with the key-axis and having edge faces on opposite sides of their key-openings for being acted upon by the flat side of change and master keys that are turned in opposite directions, in combination with a change-key and ward-plate having a shoulder for being acted upon by said change-key to prevent it from being presented to the edge faces belonging to the master-key, substantially as described.

HENRY G. VOIGHT.

Witnesses:
M. S. WIARD,
P. M. BRONSON.